US012646148B2

(12) United States Patent
Corona et al.

(10) Patent No.: US 12,646,148 B2
(45) Date of Patent: Jun. 2, 2026

(54) IMPLICIT REGISTRATION FOR IMPROVING SYNTHESIZED FULL-CONTRAST IMAGE PREDICTION TOOL

(71) Applicant: Bayer Aktiengesellschaft, Leverkusen (DE)

(72) Inventors: Veronica Corona, London (GB); Marvin Purtorab, Burton-Upon-Trent (GB); Sara Lorio, Reading (GB); Thiago Ramos Dos Santos, London (GB)

(73) Assignee: BAYER AKTIENGESELLSCHAFT, Leverkusen (DE)

( * ) Notice: Subject to any disclaimer, the term of this patent is extended or adjusted under 35 U.S.C. 154(b) by 275 days.

(21) Appl. No.: 18/556,528

(22) PCT Filed: Apr. 13, 2022

(86) PCT No.: PCT/EP2022/059836
§ 371 (c)(1),
(2) Date: Oct. 20, 2023

(87) PCT Pub. No.: WO2022/223383
PCT Pub. Date: Oct. 27, 2022

(65) Prior Publication Data
US 2024/0193738 A1 Jun. 13, 2024

(30) Foreign Application Priority Data
Apr. 21, 2021 (EP) ..................................... 21169601

(51) Int. Cl.
*G06T 5/50* (2006.01)
*G06T 5/60* (2024.01)

(52) U.S. Cl.
CPC .................. *G06T 5/50* (2013.01); *G06T 5/60* (2024.01); *G06T 2207/20081* (2013.01); *G06T 2207/20084* (2013.01)

(58) Field of Classification Search
CPC ... G06T 5/50; G06T 5/60; G06T 2207/20081; G06T 2207/20084
(Continued)

(56) References Cited

U.S. PATENT DOCUMENTS

2017/0169578 A1* 6/2017 Nakazawa .............. G06T 7/337
2019/0108634 A1* 4/2019 Zaharchuk ............... G06T 3/60

FOREIGN PATENT DOCUMENTS

WO 2019074938 A1 4/2019
WO 2021061710 A1 4/2021

OTHER PUBLICATIONS

NPL: Results Publication Date Range: Apr. 11, 2019 to Jul. 24, 2025.*
(Continued)

*Primary Examiner* — Quang N Vo
(74) *Attorney, Agent, or Firm* — Morrison & Foerster LLP

(57) ABSTRACT
A method of training a prediction tool to generate at least one synthetic full-contrast image from zero-contrast and low-contrast images of a subject may involve receiving a training set a set of images of a set of subjects, the images of each subject comprising a full-contrast image, a low-contrast image, a first zero-contrast image acquired prior to the acquisition of the full-contrast image, and a second zero-contrast image acquired prior to the acquisition of the low-contrast image. An artificial neural network may be trained with the training set by applying the first and second zero-contrast images from the set of images and the low-contrast images from the set of images as input to the
(Continued)

artificial neural network and using a cost function to compare the output of the artificial neural network with the full-contrast images from the set of images to train parameters of the artificial neural network using backpropagation.

15 Claims, 4 Drawing Sheets

(58) Field of Classification Search
USPC ......................................................... 382/254
See application file for complete search history.

(56) References Cited

OTHER PUBLICATIONS

NPL: InnovationQ by IP.com and IEEE, Results Publication Date Range: Apr. 11, 2019 to Dec. 30, 2025.*
Gong, E. et al. (Jun. 16, 2018). "Deep Learning Enables 90% Reduction in Gadolinium Dosage for Contrast Enhanced MRI", Joint Annual Meeting ISMRM-ESMRMB, vol. 26, XP040703398, pp. 1-5.
International Search Report mailed Jul. 22, 2022 for PCT Application No. PCT/EP2022/059836, filed Apr. 13, 2022, 3 pages.

* cited by examiner

IMPLICIT REGISTRATION FOR IMPROVING SYNTHESIZED FULL-CONTRAST IMAGE PREDICTION TOOL

CROSS-REFERENCE TO RELATED APPLICATIONS

This application is a national stage application under 35 U.S.C. § 371 of International Application No. PCT/EP2022/059836, filed internationally on Apr. 13, 2022, which claims the benefit of priority to European Application No. 21169601.8, filed Apr. 21, 2021.

FIELD

This invention relates generally to medical diagnostic imaging. More specifically, it relates to imaging techniques that use contrast agents.

BACKGROUND

Medical imaging is the technique and process of imaging the interior of a body for clinical analysis and medical intervention, as well as visual representation of the function of some organs or tissues (physiology). Medical imaging seeks to reveal internal structures hidden by the skin and bones, as well as to diagnose and treat diseases.

Many types of medical imaging use contrast agents to enhance the visualization of normal and abnormal structures. Examples include conventional angiography, fluoroscopy, computed tomography (CT), ultrasound, and magnetic resonance imaging (MRI). It is sometimes desirable to reduce the contrast agent dose, however, reduced dose usually reduces desired imaging enhancements.

Advances in both imaging and machine learning have synergistically led to a rapid rise in the potential use of artificial intelligence in various medical imaging tasks, such as risk assessment, detection, diagnosis, prognosis, and therapy response.

Nowadays, machine learning is used not only for classification of images or detection of symptoms, but also for the generation of synthetic images. In particular, WO2019/074938A1 discloses that machine learning is able to predict a synthesized full-dose contrast agent image from a low-dose contrast agent image and a pre-dose image.

WO2019/074938A1 relates to a method and a system for performing diagnostic imaging of a subject with reduced contrast agent dose. In a first step, a set of diagnostic images of a set of subjects is produced. The set of images comprises, for each sample of the dataset, i) a full-contrast image acquired with a full-contrast agent dose administered to the subject, ii) a low-contrast image acquired with a low-contrast agent dose administered to the subject, where the low-contrast agent dose is less than the full-contrast agent dose, and iii) a zero-contrast image acquired with no contrast agent dose administered to the subject. In a second step, a deep learning network (DLN) is trained by applying zero-contrast images from the set of images and low-contrast images from the set of images as input to the DLN and using a cost function to compare the output of the DLN with full-contrast images from the set of images to train parameters of the DLN using backpropagation. Once, the DLN is trained, it can be used to generate a synthesized full-contrast contrast agent image of a subject by applying a low-contrast image and a zero-contrast image as input to the trained DLN.

When comparing a synthesized full-contrast image generated in accordance with the method described in WO2019/074938A1 with the respective real full-contrast image, deviations can be observed; for example, some blurring artifacts may occur.

In light of the cited prior art, the technical problem to be solved is to further improve the quality of synthesized full-dose contrast agent images. In this context, quality is characterized by the ability of the models to learn small details that have very little impact on global error metrics, but bring significant clinical value, such as reduced blurring artifacts.

SUMMARY OF THE INVENTION

This problem is solved by the subject matter of the independent claims of the present invention. Preferred embodiments of the present invention are defined in the dependent claims and described in the present specification and/or displayed in the figures.

Provided is a method of training a prediction tool to generate at least one synthetic full-contrast image from zero-contrast and low-contrast images of a subject, the method comprising the steps of:

receiving a training set, the training set comprising a set of images of a set of subjects, for each subject of the set of subjects:

i) a full-contrast image acquired with a full-contrast agent dose administered to the subject, ii) a low-contrast image acquired with a low-contrast agent dose administered to the subject, where the low-contrast agent dose is less than the full-contrast agent dose, iii) a first zero-contrast image acquired with no contrast agent dose administered to the subject wherein the first zero-contrast image is acquired prior to the acquisition of the full-contrast image, and iv) a second zero-contrast image acquired with no contrast agent dose administered to the subject wherein the second zero-contrast image is acquired prior to the acquisition of the low-contrast image;

training an artificial neural network with the received training set, by applying the first and second zero-contrast images from the set of images and the low-contrast images from the set of images as input to the artificial neural network and using a cost function to compare the output of the artificial neural network with the full-contrast images from the set of images to train parameters of the artificial neural network using backpropagation.

Additionally, provided is a computer system for training an artificial neural network, the computer system comprising:

a receiving unit, a processing unit, and an output unit;

wherein the processing unit is configured to receive, via the receiving unit, a training set, the training set comprising a set of images of a set of subjects, for each subject of the set of subjects:

i) a full-contrast image acquired with a full-contrast agent dose administered to the subject, ii) a low-contrast image acquired with a low-contrast agent dose administered to the subject, where the low-contrast agent dose is less than the full-contrast agent dose, iii) a first zero-contrast image acquired with no contrast agent dose administered to the subject wherein the first zero-contrast image is acquired prior to the acquisition of the full-contrast image, and iv) a second zero-contrast image acquired with no contrast agent dose administered to the subject wherein the second zero-contrast image is acquired prior to the acquisition of the low-contrast image;

train the artificial neural network with the received training set to generate at least one synthetic full-contrast image from zero-contrast and low-contrast images of a subject, wherein the training comprises application of the first and second zero-contrast images from the set of images and the low-contrast images from the set of images as input to the artificial neural network and using a cost function to compare the output of the artificial neural network with the full-contrast images from the set of images and training of parameters of the artificial neural network by using backpropagation.

Described also is a non-transitory computer-readable storage medium comprising processor-executable instructions with which to perform an operation for training a prediction tool to generate at least one synthetic full-contrast image from zero-contrast and low-contrast images of a subject comprising:

receiving a training set, the training set comprising a set of images of a set of subjects, for each subject of the set of subjects:

i) a full-contrast image acquired with a full-contrast agent dose administered to the subject, ii) a low-contrast image acquired with a low-contrast agent dose administered to the subject, where the low-contrast agent dose is less than the full-contrast agent dose, iii) a first zero-contrast image acquired with no contrast agent dose administered to the subject wherein the first zero-contrast image is acquired prior to the acquisition of the full-contrast image, and iv) a second zero-contrast image acquired with no contrast agent dose administered to the subject wherein the second zero-contrast image is acquired prior to the acquisition of the low-contrast image;

training an artificial neural network with the received training set, by applying the first and second zero-contrast images from the set of images and the low-contrast images from the set of images as input to the artificial neural network and using a cost function to compare the output of the artificial neural network with the full-contrast images from the set of images to train parameters of the artificial neural network using backpropagation.

Additionally, provided is a method of generating a synthetic full-contrast image from zero-contrast and low-contrast images, the method comprising the steps of:

receiving an input dataset comprising i) a low-contrast image acquired with a low-contrast agent dose administered to a subject, where the low-contrast agent dose is less than a full-contrast agent dose, and ii) a zero-contrast image acquired with no contrast agent dose administered to the subject, inputting the input dataset into a prediction tool, receiving from the prediction tool the synthetic full-contrast image, outputting the synthetic full-contrast image, wherein the prediction tool was trained according to the above method.

Further provided is a computer system for generating a synthetic full-contrast image, the system comprising:

a receiving unit, a processing unit, and an output unit;

wherein the processing unit is configured to receiving, via the receiving unit, an input dataset comprising i) a low-contrast image acquired with a low-contrast agent dose administered to a subject, where the low-contrast agent dose is less than the full-contrast agent dose, and ii) a zero-contrast image acquired with no contrast agent dose administered to the subject, inputting the input dataset into a prediction tool, receiving from the prediction tool the synthetic full-contrast image, outputting the synthetic full-contrast image via the output unit, wherein the prediction tool was trained according to the above method.

The present invention further provides a non-transitory computer-readable storage medium comprising processor-executable instructions with which to perform an operation for generating at least one synthetic full-contrast image from zero-contrast and low-contrast images comprising:

receiving an input dataset comprising i) a low-contrast image acquired with a low-contrast agent dose administered to a subject, where the low-contrast agent dose is less than the full-contrast agent dose, and ii) a zero-contrast image acquired with no contrast agent dose administered to the subject, inputting the input dataset into a prediction tool, receiving from the prediction tool the synthetic full-contrast image, outputting the synthetic full-contrast image, wherein the prediction tool was trained according to the above method.

A kit comprising a contrast agent and a non-transitory computer-readable storage medium comprising processor-executable instructions with which to perform an operation for generating at least one synthetic full-contrast image from zero-contrast and low-contrast images is also described.

Further aspects of the present invention are mentioned hereinafter.

BRIEF DESCRIPTION OF THE FIGURES

The invention will now be described, by way of example only, with reference to the accompanying drawings.

DETAILED DESCRIPTION OF THE INVENTION

Figure 1:
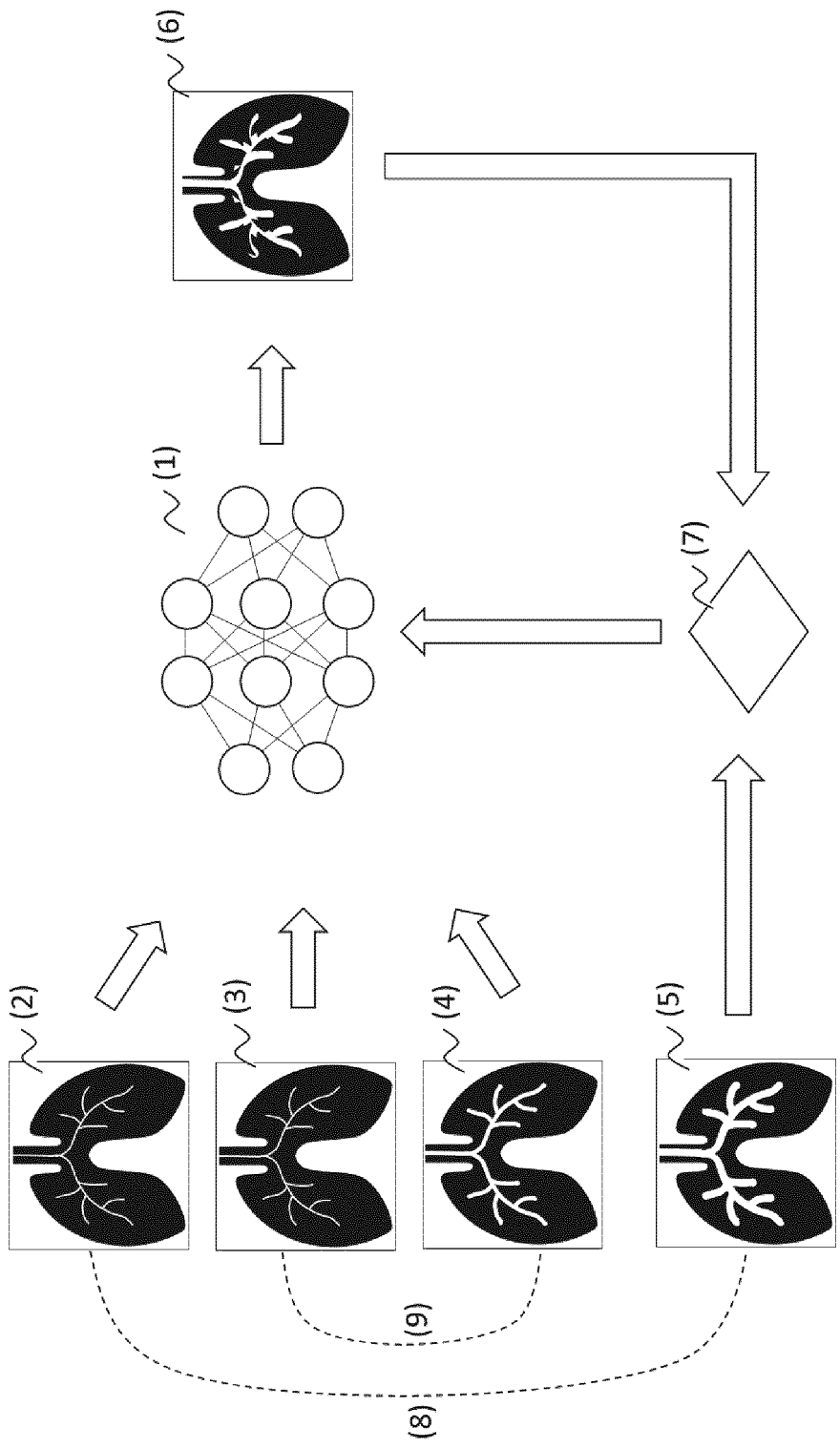
FIG. 1 shows a prediction model being trained, according to some embodiments.

The invention will be more particularly elucidated below, without distinguishing between the subjects of the invention (methods, computer systems, computer-readable storage media). On the contrary, the following elucidations are intended to apply analogously to all the subjects of the invention, irrespective of in which context (methods, computer systems, computer-readable storage media) they occur.

If steps are stated in an order in the present description or in the claims, this does not necessarily mean that the invention is restricted to the stated order. On the contrary, it is conceivable that the steps can also be executed in a different order or else in parallel to one another, unless one step builds upon another step, this absolutely requiring that the building step be executed subsequently (this being, however, clear in the individual case). The stated orders are thus preferred embodiments of the invention.

The present invention provides an improved synthesized full-dose contrast agent image prediction tool.

An "image" is a representation of a subject. The subject can be a real object such as a person and/or an animal and/or a plant and/or an inanimate object and/or a part thereof, and/or combinations thereof. The subject is preferably a person, respectively a patient.

An image can be a two-dimensional representation (2D image) such as a photograph, or a three-dimensional representation (3D image) such as a stack of sliced 2D images or a 3D model of a subject, or even a higher-dimensional representation of a subject, e.g., including a time component.

In a preferred embodiment, an image is a two- or three- or higher-dimensional representation of a human body or a part thereof. Preferably, an image is a medical image showing a part of the body of a human, such as an image created by one or more of the following techniques: microscopy, X-ray radiography, magnetic resonance imaging, computed tomography, ultrasound, endoscopy, elastography, tactile imaging, thermography, medical photography, nuclear medicine functional imaging techniques as positron emission tomography (PET), single-photon emission computed tomography (SPECT), optical coherence tomography and the like.

An image according to the present invention is a digital image. A digital image is a numeric representation, normally binary, of an image of two or more dimensions. A digital image can be a greyscale image or color image in RGB format or another color format, or a multispectral or hyperspectral image. A widely used format for digital medical images is the DICOM format (DICOM: Digital Imaging and Communications in Medicine).

A synthetic image is an image which is generated (calculated) from an input dataset. The input dataset from which a synthesized full-contrast image can be generated comprises a zero-contrast image and a low-contrast image.

The synthetic image is generated from the input dataset by means of a prediction tool. The prediction tool is configured to receive the input dataset and calculates from the input dataset the synthetic image and outputs the synthetic image. In a preferred embodiment, the prediction tool generates a synthetic full-contrast medical diagnostic image of a subject.

It is also possible that more than one synthetic image is generated from the input dataset by the prediction tool.

The prediction tool can, e.g., be or comprise an artificial neural network. An artificial neural network (ANN) is a biologically inspired computational model. An ANN usually comprises at least three layers of processing elements: a first layer with input neurons (nodes), an Nth layer with at least one output neuron (node), and N-2 inner layers, where N is a natural number greater than 2.

In such a network, the input neurons serve to receive the input dataset. If the input dataset constitutes or comprises an image, there is usually one input neuron for each pixel/voxel of the input image; there can be additional input neurons for additional input data such as data about the subject represented by the input image. The output neurons serve to predict at least one synthetic image. Usually, there is one output neuron for each pixel/voxel of the synthetic image.

The processing elements of the layers are interconnected in a predetermined pattern with predetermined connection weights therebetween. Each network node represents a (simple) calculation of the weighted sum of inputs from prior nodes and a non-linear output function. The combined calculation of the network nodes relates the inputs to the outputs.

The prediction tool is trained to generate at least one synthesized full-contrast image from the input dataset. The training can be performed, e.g., in a supervised learning with a set of training data comprising a set of images of a set of subjects, for each subject of the set of subjects:

i) a full-contrast image acquired with a full-contrast agent dose administered to the subject,
  ii) a low-contrast image acquired with a low-contrast agent dose administered to the subject, where the low-contrast agent dose is less than the full-contrast agent dose,
  iii) a first zero-contrast image acquired with no contrast agent dose administered to the subject wherein the first zero-contrast image is acquired prior to the acquisition of the full-contrast image, and
  iv) a second zero-contrast image acquired with no contrast agent dose administered to the subject wherein the second zero-contrast image is acquired prior to the acquisition of the low-contrast image.

In a preferred embodiment of the invention, the set of images of a set of subjects are pre-processed prior to the training of the artificial neural network. Pre-processing comprises the steps of registration and normalization. Registration refers to the process of transforming different sets of images into one coordinate system. Normalization refers to a process that changes the range of pixel intensity values. Pre-processing the set of images can be performed to adjust for acquisition and scaling differences between different images.

The artificial neural network is trained by applying the first and second zero-contrast images from the set of images and the low-contrast images from the set of images as input to the artificial neural network and using a cost function to compare the output of the artificial neural network with the full-contrast images from the set of images to train parameters of the artificial neural network using backpropagation.

The full-contrast image to be taken for comparison of the output of the artificial neural network—which is the image as discussed above under i)—is also referred to as the "ground truth image" hereinafter.

The "ground truth image" is the image, the synthetic full-contrast image generated by the prediction tool should look like if the prediction tool is fed by the respective input dataset. So, the aim is to train the prediction tool to generate for the low-contrast image, the first zero-contrast image, and the second zero-contrast image of a subject a synthetic full-contrast image which comes close to the ground truth image (ideally, the synthetic full-contrast image matches the ground truth image). When trained, the connection weights between the processing elements in the ANN contain information regarding the relationship between the input dataset and the ground truth images which can be used to predict synthetic images from a new input dataset.

The training data set usually comprises datasets from a multitude of subjects (e.g. patients). The term "multitude" as it is used herein means an integer greater than 1, usually greater than 10, preferably greater than 100.

For each subject, it is preferred that the first zero-contrast image is acquired prior to the acquisition of the full-contrast image. Therefore, the first zero-contrast image of the subject is acquired followed by administration of the full-contrast agent dose to the same subject and the subsequent acquisition of the full-contrast image of the subject.

Similarly, it is preferred that the second zero-contrast image is acquired prior to the acquisition of the low-contrast image. Therefore, the second zero-contrast image of the subject is acquired followed by administration of less than the full-contrast agent dose to the same subject and the subsequent acquisition of the low-contrast image of the subject.

The first zero-contrast image and the second zero-contrast image are preferably not the same.

The acquisition of the first zero-contrast image and the corresponding full-contrast image for a subject is preferably done on a different day than the acquisition of the second zero-contrast image and the corresponding low-contrast image.

The images used for training can be obtained, e.g., in dose finding trials for contrast agents. In such dose finding trials, different doses are applied to trial participants. Usually, a zero-contrast image is acquired prior to the application of a dose of the contrast agent and the acquisition of an image after the application of the contrast agent. Usually, on a first day, a first zero-contrast image is acquired, then a first dose of a contrast agent is applied, and a first image is acquired after application of the first dose of the contrast agent (e.g., a low-contrast agent dose). On a second day, a second zero-contrast image is acquired, then a second dose of the contrast agent is applied (which is usually different from the first dose) and a second image is acquired after application of the second dose of the contrast agent (e.g., a full-contrast agent dose). The images acquired on different days prior to and after the application of different doses of the contrast agent can be used for training purposes as described herein.

Surprisingly it was found that the usage of two zero-contrast images (compared to only one as described in WO2019/074938A1) results in a synthetic full-contrast image with reduced blurring artifacts. By using two zero-contrast images (compared to only one as described in WO2019/074938A1), the artificial neural network not only learns contrast enhancements but also learns an improved mapping of the inputted images and thereby generates an improved synthetic full-contrast image with reduced blurring artifacts. This significantly mitigates potential registration errors between input and target images.

The artificial neural network can employ any image-to-image neural network architecture; for example, the artificial neural network can be of the class of convolutional neural networks (CNN).

A CNN is a class of deep neural networks, most commonly applied to analyzing visual imagery. A CNN comprises an input layer with input neurons, an output layer with at least one output neuron, as well as multiple hidden layers between the input layer and the output layer.

The hidden layers of a CNN typically comprise convolutional layers, ReLU (Rectified Linear Units) layers, i.e., activation function, pooling layers, fully connected layers and normalization layers.

The nodes in the CNN input layer can be organized into a set of "filters" (feature detectors), and the output of each set of filters is propagated to nodes in successive layers of the network. The computations for a CNN include applying the mathematical convolution operation with each filter to produce the output of that filter. Convolution is a specialized kind of mathematical operation performed with two functions to produce a third function. In convolutional network terminology, the first function of the convolution can be referred to as the input, while the second function can be referred to as the convolution kernel. The output may be referred to as the feature map. For example, the input of a convolution layer can be a multidimensional array of data that defines the various color components of an input image. The convolution kernel can be a multidimensional array of parameters, where the parameters are adapted by the training process for the neural network.

The objective of the convolution operation is to extract features (such as, e.g., edges from an input image). Conventionally, the first convolutional layer is responsible for capturing the low-level features such as edges, color, gradient orientation, etc. With added layers, the architecture adapts to the high-level features as well, giving a network which has the wholesome understanding of images in the dataset. Similar to the convolutional layer, the pooling layer is responsible for reducing the spatial size of the feature maps. It is useful for extracting dominant features with some degree of rotational and positional invariance, thus maintaining the process of effectively training of the model. Adding a fully-connected layer is a way of learning non-linear combinations of the high-level features as represented by the output of the convolutional part.

In a preferred embodiment of the present invention, the artificial neural network is based on a specific kind of convolutional architecture called U-Net (see, e.g., O. Ronneberger et al.: U-net: Convolutional networks for biomedical image segmentation, in: International Conference on Medical image computing and computer-assisted intervention, pp. 234-241, Springer, 2015, https://doi.org/10.1007/978-3-319-24574-4_28). The U-Net architecture consists of two main blocks, an encoding path and a decoding path. The encoding path uses convolutions, activation functions and pooling layers to extract image features, while the decoding path replaces the pooling layers with upsampling layers to project the extracted features back to pixel space, and finally recovers the image dimension at the end of the architecture. These are used in combination with activation functions and convolutions. Finally, the feature maps from the encoding paths can be concatenated to the feature maps in the decoding path in order to preserve fine details from the input data.

More details about how to implement a convolutional neural network can be found in the literature (see, e.g., Yu Han Liu: Feature Extraction and Image Recognition with Convolutional Neural Networks, 2018, J. Phys.: Conf. Ser. 1087 062032; H. H. Aghdam et al.: Guide to Convolutional Neural Networks, Springer 2017, ISBN: 978-3-319-57549-0; S. Khan et al.: Convolutional Neural Networks for Computer Vision, Morgan & Claypool Publishers, 2018, ISBN: 978-1-681-730219).

The "full-contrast agent dose" is preferably the dose which is recommended by the manufacturer or distributor of the contrast agent. The "full-contrast agent dose" is usually the dose which is mentioned in the product label of the contrast agent.

The "low-contrast agent dose" is preferably less than 50% of a full contrast agent dose. As an example, in magnetic resonance contrast agents such as gadolinium chelates like gadopentetate dimeglumine (trade name: Magnevist® and others), gadobenate dimeglumine (trade name: Multihance®), gadoteric acid (Dotarem®, Dotagita®, Cyclolux®), gadodiamide (Omniscan®), gadoteridol (Pro- Hance®) and gadobutrol (Gadovist®) are used. The contrast-enhancing effect of Primovist®/Eovist® is mediated by the stable gadolinium complex Gd-EOB-DTPA (gadolinium ethoxybenzyldiethylenetriaminepentaacetic acid). Primovist® is injected intravenously as a bolus, in a weight-adapted dose. The recommended dose (the full dose) is 0.025 mmol/kg body weight or 0.1 ml/kg body weight. In the context of the invention, "a dose corresponding to 100% of the full dose of the contrast agent" signifies, for example in connection with Gd-EOB-DTPA disodium, that 0.025 mmol/kg body weight or 0.1 ml/kg body weight is administered to a patient. Accordingly, "preferably less than 50% of the full contrast agent dose" signifies that at most 0.0125 mmol/kg body weight or at most 0.05 ml/kg body weight is administered to a subject such as a patient.

The cost function is computed on the basis of the synthetic full-contrast image and the ground truth image. Examples of cost functions that can be used include L1 loss, L2 loss, structure similarity index measure (SSIM) or combination of the above to name a few. More details about loss functions may be found in the scientific literature (see, e.g.: K. Janocha et al.: On Loss Functions for Deep Neural Networks in Classification, 2017, arXiv: 1702.05659v1 [cs.LG]; H. Zhao et al.: Loss Functions for Image Restoration with Neural Networks, 2018, arXiv: 1511.08861v3 [cs.CV]).

For training and/or pre-training of the ANN, a cross-validation method can be employed to split the training data set into training and validation data sets. The training data set is used in the backpropagation training of the network weights. The validation data set is used to verify that the trained network generalizes to make good predictions. The best network weight set can be taken as the one that best predicts the outputs of the test data set. Similarly, varying the number of network hidden nodes and determining the network that performs best with the data sets optimizes the number of hidden nodes.

Note that at inference time and when only one zero-contrast image is available, the same zero-contrast image is inputted twice to the model to fulfil the technical requirements.

FIG. 1 shows schematically by way of example how a prediction tool according to the present invention is trained. The prediction tool comprises an artificial neural network (1). The artificial neural network (1) is trained using (for each subject of a multitude of subjects) at least four images:
  a first zero-contrast image (2),
  a second zero-contrast image (3),
  a low-contrast image (4), and
  a full-contrast image (5).
The first zero-contrast image (2) was acquired with no contrast agent dose administered to the subject. Additionally, the first zero-contrast image (2) was acquired prior to the acquisition of the full-contrast image (5).

The second zero-contrast image (3) was also acquired with no contrast agent dose administered to the subject. Additionally, the second zero-contrast image (3) was acquired prior to the acquisition of the low-contrast image (4).

The low-contrast image (4) was acquired with a low-contrast agent dose administered to the subject, where the low-contrast agent dose is less than the full-contrast agent dose.

The artificial neural network (1) is configured to receive:
  the first zero-contrast image (2),
  the second zero-contrast image (3), and
  the low-contrast image (4).

In a preferred embodiment, the full-contrast image (5), also referred to as "the ground truth image", was acquired immediate after the acquisition of the first zero-contrast image (2). This relationship is indicated in FIG. 1 by the dotted line (8). Similarly, the low-low contrast image (4) was preferably acquired immediate after the acquisition of the second zero-contrast image (3). This relationship is indicated in FIG. 1 by the dotted line (9). The artificial neural network (1) is trained to generate a synthetic full-contrast image (6) from the set of input images of the subject (2, 3 and 4) which comes close to the full-contrast image (5) (the ground truth image). In case of the example as depicted in FIG. 1, the synthetic full-contrast image (6) deviates from the ground truth image (5). In order to limit the deviations, a cost function (7) is used for the training of the artificial neural network (1). The aim of the cost function (7) is to minimize the deviations between the synthetic full-contrast image (6) and the ground truth image (5).

Once trained, the prediction tool can be used to generate synthetic full-contrast images on the basis of new input data.

In accordance with a further aspect, the present invention provides a method of generating a synthetic full-contrast image from zero-contrast and low-contrast images, the method comprising the steps of:
  receiving an input dataset comprising i) a low-contrast image acquired with a low-contrast agent dose administered to a subject, where the low-contrast agent dose is less than a full-contrast agent dose, and ii) a zero-contrast image acquired with no contrast agent dose administered to the subject,
  inputting the input dataset into a prediction tool,
  receiving from the prediction tool the synthetic full-contrast image,
  outputting the synthetic full-contrast image,
wherein the prediction tool was trained in a supervised learning on the basis of a training set to generate synthetic full-contrast images from zero-contrast and low-contrast images of a subject, wherein for the training of the prediction tool, the prediction tool:
  received a training set, the training set comprising a set of images of a set of subjects, for each subject of the set of subjects:
    i) a full-contrast image acquired with a full-contrast agent dose administered to the subject,
    ii) a low-contrast image acquired with a low-contrast agent dose administered to the subject, where the low-contrast agent dose is less than the full-contrast agent dose,
    iii) a first zero-contrast image acquired with no contrast agent dose administered to the subject wherein the first zero-contrast image is acquired prior to the acquisition of the full-contrast image, and
    iv) a second zero-contrast image acquired with no contrast agent dose administered to the subject wherein the second zero-contrast image is acquired prior to the acquisition of the low-contrast image;
  was trained with the received training set, by applying the first and second zero-contrast images from the set of images and the low-contrast images from the set of images as input to the prediction tool and using a cost function to compare the output of the prediction tool with the full-contrast images from the set of images.

In accordance with a further aspect, the present invention provides a computer system for generating a synthetic full-contrast image, the system comprising:
  a receiving unit, a processing unit, and an output unit;

wherein the processing unit is configured to:

receive, via the receiving unit, an input dataset comprising i) a low-contrast image acquired with a low-contrast agent dose administered to a subject, where the low-contrast agent dose is less than a full-contrast agent dose, and ii) a zero-contrast image acquired with no contrast agent dose administered to the subject, input the input dataset into a prediction tool, receive from the prediction tool the synthetic full-contrast image, output the synthetic full-contrast image via the output unit, wherein the prediction tool was trained in a supervised learning on the basis of a training set to generate synthetic full-contrast images from zero-contrast and low-contrast images of a subject, wherein for the training of the prediction tool, the prediction tool:

received a training set, the training set comprising a set of images of a set of subjects, for each subject of the set of subjects:

i) a full-contrast image acquired with a full-contrast agent dose administered to the subject, ii) a low-contrast image acquired with a low-contrast agent dose administered to the subject, where the low-contrast agent dose is less than the full-contrast agent dose, iii) a first zero-contrast image acquired with no contrast agent dose administered to the subject wherein the first zero-contrast image is acquired prior to the acquisition of the full-contrast image, and iv) a second zero-contrast image acquired with no contrast agent dose administered to the subject wherein the second zero-contrast image is acquired prior to the acquisition of the low-contrast image;

was trained with the received training set, by applying the first and second zero-contrast images from the set of images and the low-contrast images from the set of images as input to the prediction tool and using a cost function to compare the output of the prediction tool with the full-contrast images from the set of images.

In accordance with a further aspect, the present invention provides a non-transitory computer-readable storage medium comprising processor-executable instructions with which to perform an operation for generating at least one synthetic full-contrast image from zero-contrast and low-contrast images comprising:

receiving an input dataset comprising i) a low-contrast image acquired with a low-contrast agent dose administered to a subject, where the low-contrast agent dose is less than the full-contrast agent dose, and ii) a zero-contrast image acquired with no contrast agent dose administered to the subject, inputting the input dataset into a prediction tool, receiving from the prediction tool the synthetic full-contrast image, outputting the synthetic full-contrast image, wherein the prediction tool was trained in a supervised learning on the basis of a training set to generate synthetic full-contrast images from zero-contrast and low-contrast images of a subject, wherein for the training of the prediction tool, the prediction tool:

received a training set, the training set comprising a set of images of a set of subjects, for each subject of the set of subjects:

i) a full-contrast image acquired with a full-contrast agent dose administered to the subject, ii) a low-contrast image acquired with a low-contrast agent dose administered to the subject, where the low-contrast agent dose is less than the full-contrast agent dose, iii) a first zero-contrast image acquired with no contrast agent dose administered to the subject wherein the first zero-contrast image is acquired prior to the acquisition of the full-contrast image, and iv) a second zero-contrast image acquired with no contrast agent dose administered to the subject wherein the second zero-contrast image is acquired prior to the acquisition of the low-contrast image;

was trained with the received training set, by applying the first and second zero-contrast images from the set of images and the low-contrast images from the set of images as input to the prediction tool and using a cost function to compare the output of the prediction tool with the full-contrast images from the set of images.

A further embodiment of the invention relates to a kit comprising a contrast agent and a non-transitory computer-readable storage medium which comprises processor-executable instructions with which to perform an operation for generating at least one synthetic full-contrast image from zero-contrast and low-contrast images.

In a preferred embodiment, the kit comprises at least one magnetic resonance contrast agent and a non-transitory computer-readable storage medium which comprises processor-executable instructions with which to perform an operation for generating at least one synthetic magnetic resonance full-contrast image from magnetic resonance zero-contrast and low-contrast images. The at least one magnetic resonance contrast agent is preferably selected from the group of gadolinium chelates, gadobenate dimeglumine, gadoteric acid, gadodiamide, gadoteridol, and gadobutrol.

Figure 2:
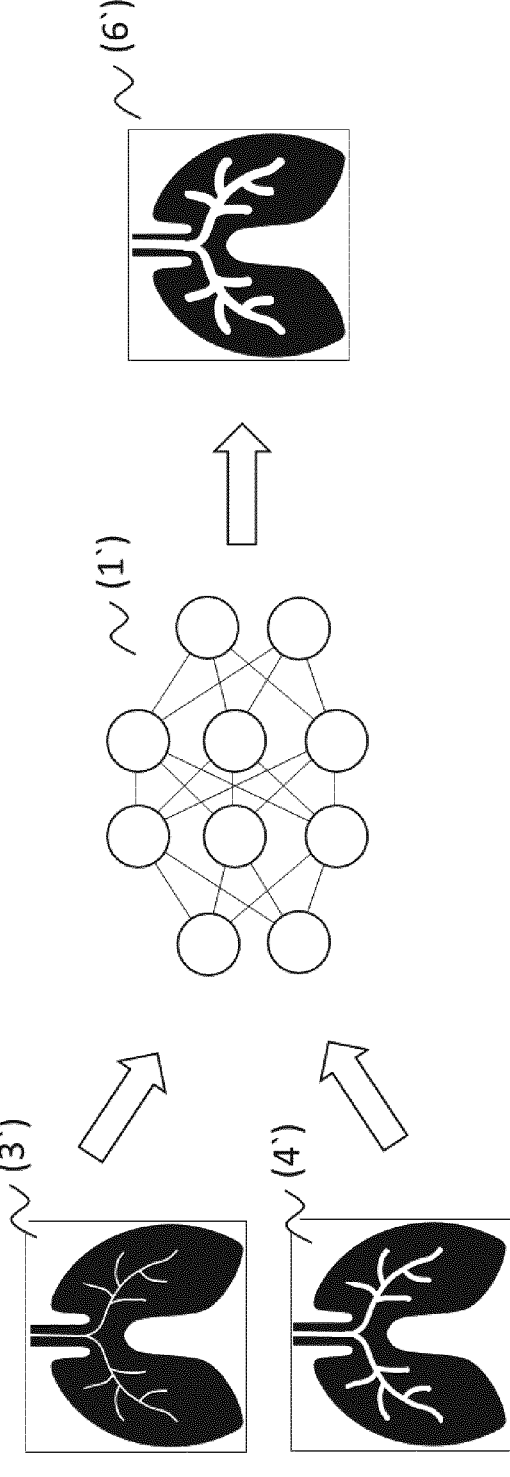
FIG. 2 shows a trained prediction tool, according to some embodiments.

FIG. 2 shows schematically by way of example, a trained prediction tool which is used for generating a synthetic full-contrast image from input dataset.

The prediction tool (1') is or comprises the artificial neural network (1) of FIG. 1 which was trained as described for FIG. 1. The prediction tool (1') receives a new input dataset which comprises a low-contrast image (3') and a zero-contrast image (4') of a subject and generates a synthetic full-contrast image (6') from the new input dataset (3',4').

Figure 3:
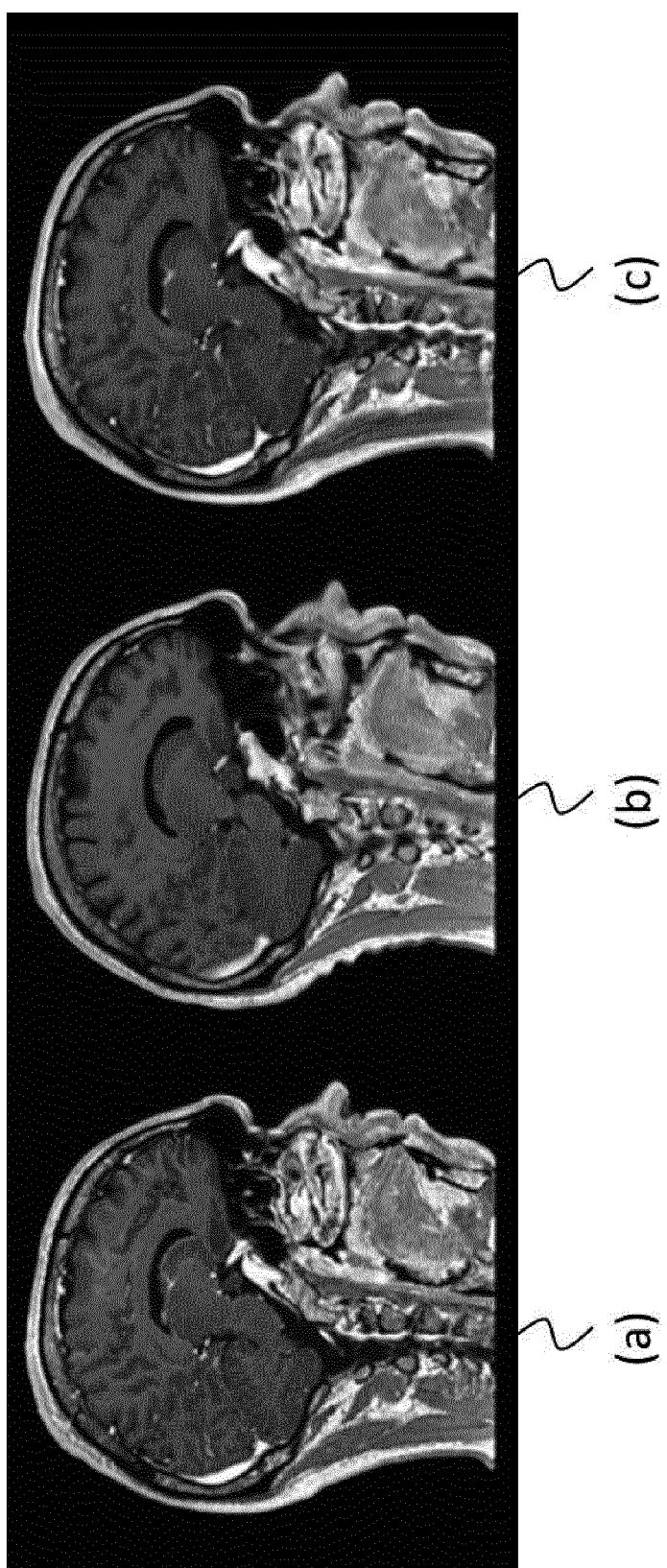
FIG. 3 shows a comparison between a ground truth image, a state-of-the-art prediction, and a prediction obtained using the described invention, according to some embodiments.

FIG. 3 shows a comparison between a ground truth image (a), a state-of-the art prediction (b) (as described in WO2019/074938A1), and a prediction obtained with the training as described herein (c). The improved training (c) allows to refine the small details that are missing or blurred in the state-of-the art prediction image (b).

The operations in accordance with the teachings herein may be performed by at least one computer specially constructed for the desired purposes or general-purpose computer specially configured for the desired purpose by at least one computer program stored in a typically non-transitory computer readable storage medium.

The term "non-transitory" is used herein to exclude transitory, propagating signals or waves, but to otherwise include any volatile or non-volatile computer memory technology suitable to the application.

The term "computer" should be broadly construed to cover any kind of electronic device with data processing capabilities, including, by way of non-limiting example, personal computers, servers, embedded cores, computing system, communication devices, processors (e.g. digital signal processor (DSP), microcontrollers, field programmable gate array (FPGA), application specific integrated circuit (ASIC), etc.) and other electronic computing devices.

The term "process" as used herein is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

Any suitable input device, such as but not limited to a keyboard, a mouse, a microphone and/or a camera sensor, may be used to generate or otherwise provide information received by the system and methods shown and described herein. Any suitable output device or display, such as but not limited to a computer screen (monitor) and/or printer may be used to display or output information generated by the system and methods shown and described herein. Any suitable processor/s, such as bot not limited to a CPU, DSP, FPGA and/or ASIC, may be employed to compute or generate information as described herein and/or to perform functionalities described herein. Any suitable computerized data storage, such as but not limited to optical disks, CDROMs, DVDs, BluRays, magnetic-optical discs or other discs; RAMs, ROMs, EPROMS, EEPROMs, magnetic or optical or other cards, may be used to store information received by or generated by the systems shown and described herein. Functionalities shown and described herein may be divided between a server computer and a plurality of client computers. These or any other computerized components shown and described herein may communicate between themselves via a suitable computer network.

Figure 4:
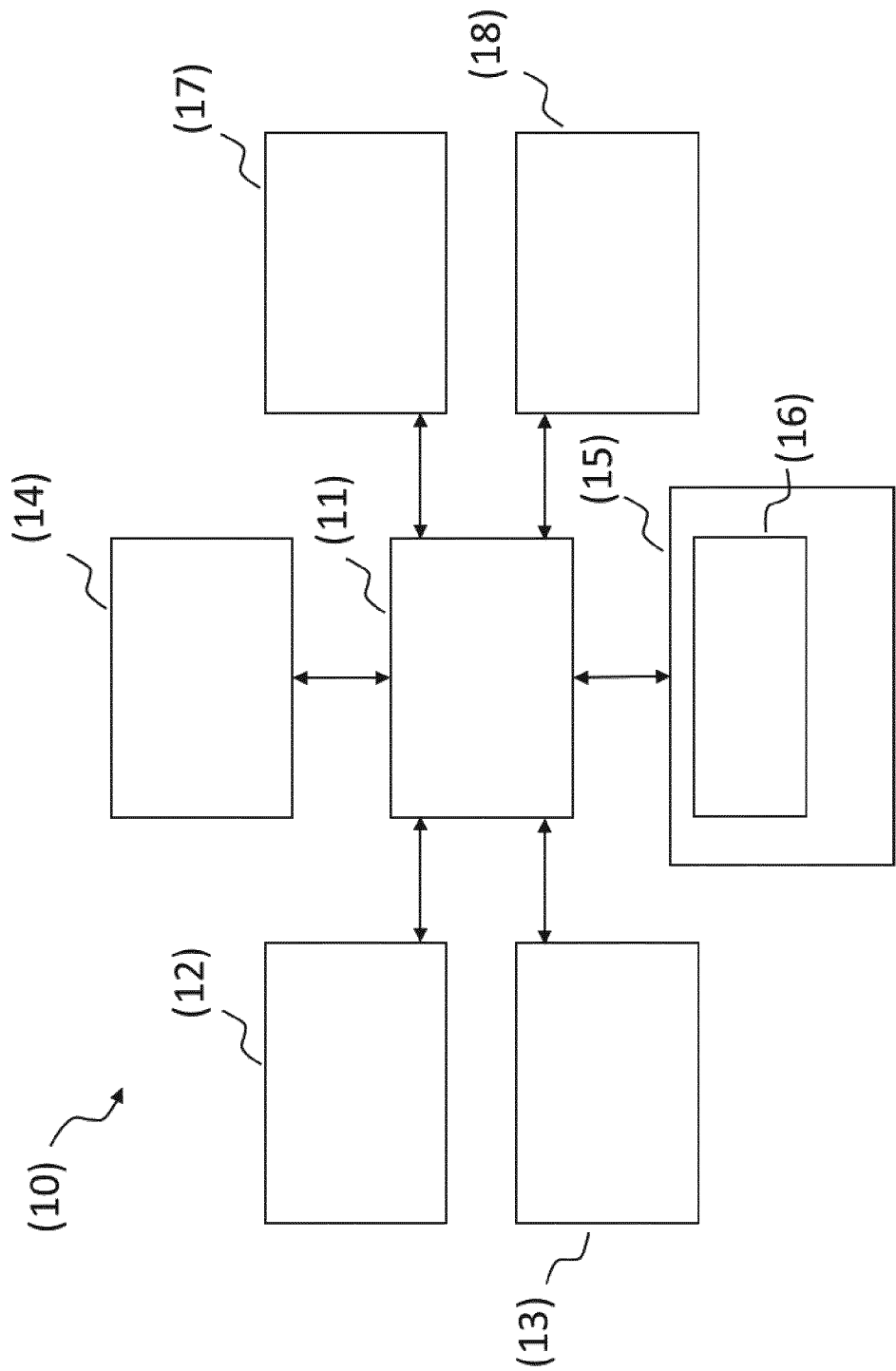
FIG. 4 shows a computer system, according to some embodiments.

FIG. 4 illustrates a computer system (10) according to some example implementations of the present invention in more detail. Generally, a computer system of exemplary implementations of the present disclosure may be referred to as a computer and may comprise, include, or be embodied in one or more fixed or portable electronic devices. The computer may include one or more of each of a number of components such as, for example, processing unit (11) connected to a memory (15) (e.g., storage device).

The processing unit (11) may be composed of one or more processors alone or in combination with one or more memories. The processing unit is generally any piece of computer hardware that is capable of processing information such as, for example, data (incl. digital images), computer programs and/or other suitable electronic information. The processing unit is composed of a collection of electronic circuits some of which may be packaged as an integrated circuit or multiple interconnected integrated circuits (an integrated circuit at times more commonly referred to as a "chip"). The processing unit (11) may be configured to execute computer programs, which may be stored onboard the processing unit or otherwise stored in the memory (15) of the same or another computer.

The processing unit (11) may be a number of processors, a multi-core processor or some other type of processor, depending on the particular implementation. Further, the processing unit may be implemented using a number of heterogeneous processor systems in which a main processor is present with one or more secondary processors on a single chip. As another illustrative example, the processing unit may be a symmetric multi-processor system containing multiple processors of the same type. In yet another example, the processing unit may be embodied as or otherwise include one or more ASICs, FPGAs or the like. Thus, although the processing unit may be capable of executing a computer program to perform one or more functions, the processing unit of various examples may be capable of performing one or more functions without the aid of a computer program. In either instance, the processing unit may be appropriately programmed to perform functions or operations according to example implementations of the present disclosure.

The memory (15) is generally any piece of computer hardware that is capable of storing information such as, for example, data, computer programs (e.g., computer-readable program code (16)) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD, Blu-ray disk or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory (15), the processing unit (11) may also be connected to one or more interfaces (12, 13, 14, 17, 18) for displaying, transmitting and/or receiving information. The interfaces may include one or more communications interfaces (17, 18) and/or one or more user interfaces (12, 13, 14). The communications interface(s) may be configured to transmit and/or receive information, such as to and/or from other computer(s), network(s), database(s) or the like. The communications interface may be configured to transmit and/or receive information by physical (wired) and/or wireless communications links. The communications interface(s) may include interface(s) to connect to a network, such as using technologies such as cellular telephone, Wi-Fi, satellite, cable, digital subscriber line (DSL), fiber optics and the like. In some examples, the communications interface(s) may include one or more short-range communications interfaces configured to connect devices using short-range communications technologies such as NFC, RFID, Bluetooth, Bluetooth LE, ZigBee, infrared (e.g., IrDA) or the like.

The user interfaces (12, 13, 14) may include a display (14). The display (14) may be configured to present or otherwise display information to a user, suitable examples of which include a liquid crystal display (LCD), light-emitting diode display (LED), plasma display panel (PDP) or the like. The user input interface(s) (12, 13) may be wired or wireless, and may be configured to receive information from a user into the computer system (10), such as for processing, storage and/or display. Suitable examples of user input interfaces include a microphone, image or video capture device, keyboard or keypad, joystick, touch-sensitive surface (separate from or integrated into a touchscreen) or the like. In some examples, the user interfaces may include automatic identification and data capture (AIDC) technology for machine-readable information. This may include barcode, radio frequency identification (RFID), magnetic stripes, optical character recognition (OCR), integrated circuit card (ICC), and the like. The user interfaces may further include one or more interfaces for communicating with peripherals such as printers and the like.

As indicated above, program code instructions may be stored in memory, and executed by processing unit that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, processing unit or other programmable apparatus to function in a particular manner to thereby generate a particular machine or particular article of manufacture. The program code instructions may be retrieved from a computer-readable storage medium and loaded into a computer, processing unit or other programmable apparatus to configure the computer, processing unit or other programmable apparatus to execute operations to be performed on or by the computer, processing unit or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

The invention claimed is:

1. A method of training a prediction tool to generate at least one synthetic full-contrast image from zero-contrast and low-contrast images of a subject, the method comprising:

receiving a training set, the training set comprising a set of images of a set of subjects, the images of each subject of the set of subjects comprising:

a full-contrast image acquired with a full-contrast agent dose administered to the subject, a low-contrast image acquired with a low-contrast agent dose administered to the subject, where the low-contrast agent dose is less than the full-contrast agent dose, a first zero-contrast image acquired with no contrast agent dose administered to the subject, wherein the first zero-contrast image is acquired prior to the acquisition of the full-contrast image, and a second zero-contrast image acquired with no contrast agent dose administered to the subject, wherein the second zero-contrast image is acquired prior to the acquisition of the low-contrast image;

training an artificial neural network with the received training set, wherein training comprises:

applying the first and second zero-contrast images of each subject from the set of images and the low-contrast images of each subject from the set of images as input to the artificial neural network, and using a cost function to compare the output of the artificial neural network with the full-contrast images from the set of images to train parameters of the artificial neural network using backpropagation.

2. The method of claim 1, wherein the images of the set of images of the set of subjects are pre-processed prior to the training of the artificial neural network, wherein pre-processing comprises the steps of registration and normalization.

3. The method of claim 1, wherein the low-contrast agent dose administered to the subject prior to the acquisition of the low-contrast image is less than 50% of a full-contrast agent dose.

4. The method of claim 1, wherein each subject is a patient and the images of each subject in the set of images are medical images of the patient.

5. The method of claim 1, wherein the set of images of the set of subjects is acquired with imaging selected from the group of: microscopy, X-ray radiography, magnetic resonance imaging, computed tomography, ultrasound, endoscopy, elastography, tactile imaging, thermography, medical photography, nuclear medicine functional imaging techniques as positron emission tomography (PET), single-photon emission computed tomography (SPECT), and optical coherence tomography.

6. The method of claim 1, wherein the artificial neural network is a convolutional neural network (CNN) and comprises preferably a U-Net convolutional architecture.

7. The method of claim 1, wherein the prediction tool generates at least one synthetic full-contrast medical diagnostic image of a subject.

8. The method of claim 1, further comprising:

receiving an input dataset comprising an input low-contrast image acquired with the low-contrast agent dose administered to a subject, and an input zero-contrast image acquired with no contrast agent dose administered to the subject, inputting the input dataset into the prediction tool, receiving from the prediction tool the synthetic full-contrast image, and outputting the synthetic full-contrast image.

9. A computer system for training a prediction tool to generate at least one synthetic full-contrast image from zero-contrast and low-contrast images of a subject, the computer system comprising:

a receiving unit, a processing unit, and an output unit;

wherein the processing unit is configured to:

receive, via the receiving unit, a training set, the training set comprising a set of images of a set of subjects, the images of each subject of the set of subjects comprising:

a full-contrast image acquired with a full-contrast agent dose administered to the subject, a low-contrast image acquired with a low-contrast agent dose administered to the subject, where the low-contrast agent dose is less than the full-contrast agent dose, a first zero-contrast image acquired with no contrast agent dose administered to the subject, wherein the first zero-contrast image is acquired prior to the acquisition of the full-contrast image, and a second zero-contrast image acquired with no contrast agent dose administered to the subject, wherein the second zero-contrast image is acquired prior to the acquisition of the low-contrast image; and train an artificial neural network with the received training set to generate at least one synthetic full-contrast image from zero-contrast and low-contrast images of a subject, wherein the training comprises:

applying the first and second zero-contrast images from the set of images and the low-contrast images from the set of images as input to the artificial neural network, and using a cost function to compare the output of the artificial neural network with the full-contrast images from the set of images and training of parameters of the artificial neural network using back-propagation.

10. The computer system of claim 9, wherein the processing unit is further configured to:

receive, via the receiving unit, an input dataset comprising an input low-contrast image acquired with the low-contrast agent dose administered to a subject, and a zero-contrast image acquired with no contrast agent dose administered to the subject, input the input dataset into the prediction tool, receive from the prediction tool the synthetic full-contrast image, and output the synthetic full-contrast image via the output unit.

11. A non-transitory computer-readable storage medium comprising processor-executable instructions with which to perform an operation for training a prediction tool to generate at least one synthetic full-contrast image from zero-contrast and low-contrast images of a subject, the operation comprising:

receiving a training set, the training set comprising a set of images of a set of subjects, the images of each subject of the set of subjects comprising:

a full-contrast image acquired with a full-contrast agent dose administered to the subject, a low-contrast image acquired with a low-contrast agent dose administered to the subject, where the low-contrast agent dose is less than the full-contrast agent dose, a first zero-contrast image acquired with no contrast agent dose administered to the subject, wherein the first zero-contrast image is acquired prior to the acquisition of the full-contrast image, and a second zero-contrast image acquired with no contrast agent dose administered to the subject, wherein the second zero-contrast image is acquired prior to the acquisition of the low-contrast image; and training an artificial neural network with the received training set, wherein training comprises:

applying the first and second zero-contrast images from the set of images and the low-contrast images from the set of images as input to the artificial neural network, and using a cost function to compare the output of the artificial neural network with the full-contrast images from the set of images to train parameters of the artificial neural network using backpropagation.

12. The non-transitory computer-readable storage medium of claim 9, wherein the operation further comprises:

receiving an input dataset comprising an input low-contrast image acquired with the low-contrast agent dose administered to a subject, and a zero-contrast image acquired with no contrast agent dose administered to the subject, inputting the input dataset into a prediction tool, receiving from the prediction tool the synthetic full-contrast image, and outputting the synthetic full-contrast image.

13. A kit comprising a contrast agent and the non-transitory computer-readable storage medium of claim 12.

14. The kit of claim 13, wherein the contrast agent is a magnetic resonance contrast agent and wherein the non-transitory computer-readable storage medium comprises processor-executable instructions with which to perform an operation for generating at least one synthetic magnetic resonance full-contrast image from magnetic resonance zero-contrast and low-contrast images.

15. The kit of claim 14, wherein the magnetic resonance contrast agent is selected from the group of gadolinium chelates, gadobenate dimeglumine, gadoteric acid, gadodiamide, gadoteridol, and gadobutrol.

* * * * *